United States Patent
Andrizzi et al.

(10) Patent No.: US 10,521,854 B1
(45) Date of Patent: Dec. 31, 2019

(54) SELECTION AND DISPLAY OF CUSTOM USER INTERFACE CONTROLS

(71) Applicant: Amazon Technologies, Inc., Seattle, WA (US)

(72) Inventors: Stephan Josef Andrizzi, San Francisco, CA (US); Jai Prakash Chabria, Seattle, WA (US); Nicole Dare, Shoreline, WA (US); Kenneth DeLand, Issaquah, WA (US); Nirav Praful Desai, Sammamish, WA (US); Anindya Guha, Seattle, WA (US); Marc Hensley, Seattle, WA (US); Douglas James Herrington, Seattle, WA (US); Samuel Stevens Heyworth, Seattle, WA (US); Apoorva Iyer, Bellevue, WA (US); Nitish Kumar, Seattle, WA (US); Hannah McClellan Richards, Seattle, WA (US); Jae Park, Bellevue, WA (US); Amir Pelleg, Seattle, WA (US); Jessica Protasio, Seattle, WA (US); Daniel Benjamin Rausch, Seattle, WA (US); Laura Allison Ridlehoover, Seattle, WA (US); Jeffrey Rosenberg, Seattle, WA (US); Paul Warren Smart, Seattle, WA (US); Amirali Virani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 15/398,637

(22) Filed: Jan. 4, 2017

(51) Int. Cl.
*G06F 3/0482* (2013.01)
*G06F 3/0481* (2013.01)
*G06Q 30/06* (2012.01)

(52) U.S. Cl.
CPC ....... *G06Q 30/0641* (2013.01); *G06F 3/0482* (2013.01); *G06Q 30/0631* (2013.01)

(58) Field of Classification Search
CPC ............................ G06F 17/20; G06F 16/9535
See application file for complete search history.

(56) References Cited

U.S. PATENT DOCUMENTS

| 6,014,638 A | 1/2000 | Burge et al. |
| 7,827,157 B2 | 11/2010 | Shilo et al. |

(Continued)

FOREIGN PATENT DOCUMENTS

| EP | 2746926 A2 | 6/2014 |
| WO | WO 2009/142768 A1 | 11/2009 |

OTHER PUBLICATIONS

Introducing Your Dash Buttons: Shortcuts to shop your favorite products, by amazon.com, dated Jan. 20, 2017, https://www.youtube.com/watch?time_continue=2&v=wllrQgXa6pY.

(Continued)

*Primary Examiner* — Rayeez R Chowdhury
(74) *Attorney, Agent, or Firm* — Knobbe, Martens, Olson & Bear, LLP

(57) ABSTRACT

Systems, methods, and computer-readable media are described for selecting and displaying custom user interface ("UI") controls. A user of a networked computing service may create custom UI controls that perform user-specified actions, and the networked computing service may present these custom UI controls as part of its user interface. The networked computing service may determine which of a set of custom UI controls to present based on criteria such as frequency or recency of recurring usage, a context or a category associated with the custom UI controls, user preferences, the status of a pending action, usage of similar custom UI controls by other users, or other criteria. The networked computing service may present an interface that (Continued)

enables further customization or modification of the custom UI controls.

19 Claims, 8 Drawing Sheets

(56) References Cited

U.S. PATENT DOCUMENTS

| | | | |
|---|---|---|---|
| 7,886,011 B2 | 2/2011 | Buchheit | |
| 8,417,357 B2 | 4/2013 | Husoy et al. | |
| 8,519,971 B1 | 8/2013 | Mackraz | |
| 8,898,573 B2 | 11/2014 | Chang et al. | |
| 8,959,476 B2 | 2/2015 | Ramani et al. | |
| 9,003,295 B2 | 4/2015 | Baschy | |
| 9,003,296 B2 | 4/2015 | Murthy et al. | |
| 9,563,877 B2* | 2/2017 | MacBeth | G06Q 10/107 |
| 9,779,457 B1 | 10/2017 | Fisher et al. | |
| 2004/0003406 A1* | 1/2004 | Billmaier | G06F 1/3203 |
| | | | 725/60 |
| 2007/0192692 A1 | 8/2007 | Chen et al. | |
| 2007/0203804 A1 | 8/2007 | Kargman | |
| 2008/0136785 A1 | 6/2008 | Baudisch et al. | |
| 2009/0237361 A1 | 9/2009 | Mosby et al. | |
| 2010/0185989 A1 | 7/2010 | Shiplacoff et al. | |
| 2010/0257479 A1* | 10/2010 | Do | G06F 9/453 |
| | | | 715/780 |
| 2011/0018827 A1 | 1/2011 | Wang et al. | |
| 2011/0141031 A1 | 6/2011 | McCullough et al. | |
| 2011/0231224 A1* | 9/2011 | Winters | G06Q 30/0201 |
| | | | 705/7.29 |
| 2011/0231225 A1* | 9/2011 | Winters | G06Q 20/10 |
| | | | 705/7.29 |
| 2012/0032979 A1 | 2/2012 | Blow et al. | |
| 2012/0054671 A1 | 3/2012 | Thompson et al. | |
| 2013/0271375 A1 | 10/2013 | Griffin et al. | |
| 2014/0007012 A1* | 1/2014 | Govande | G06Q 30/02 |
| | | | 715/835 |
| 2014/0028701 A1 | 1/2014 | Eriksson et al. | |
| 2014/0071060 A1 | 3/2014 | Santos-Gomez | |
| 2014/0085202 A1 | 3/2014 | Hamalainen et al. | |
| 2014/0157167 A1 | 6/2014 | Zhu | |
| 2014/0249763 A1 | 9/2014 | Shimuta | |
| 2015/0006314 A1* | 1/2015 | Goulart | G06Q 30/0631 |
| | | | 705/26.7 |
| 2015/0253885 A1* | 9/2015 | Kagan | G06F 16/248 |
| | | | 368/10 |
| 2016/0054791 A1* | 2/2016 | Mullins | G04G 21/00 |
| | | | 345/173 |
| 2016/0109969 A1 | 4/2016 | Keating et al. | |
| 2016/0378334 A1 | 12/2016 | Liu et al. | |
| 2017/0083096 A1 | 3/2017 | Rihn et al. | |
| 2018/0088786 A1 | 3/2018 | Abzarian et al. | |
| 2018/0181293 A1 | 6/2018 | Dare et al. | |
| 2018/0181294 A1 | 6/2018 | Dare et al. | |
| 2018/0188933 A1 | 7/2018 | Andrizzi et al. | |
| 2018/0188934 A1 | 7/2018 | Andrizzi et al. | |
| 2018/0260107 A1 | 9/2018 | Dare et al. | |

OTHER PUBLICATIONS

Pixelmator Tip #7 Create and share your own custom Pixelmator shapes, by Pixelmator, dated Aug. 7, 2013, http://www.pixelmatortemplates.com/pixelmator-tip-7-create-and-share-your-own-customs-shapes/, 3 pages.

Roberts, Emily, 'Introducing the Amazon Dash Button and Dash Replenishment Service,' Amazon 2 Appstore Biogs, dated Mar. 31, 2015, retrieved Oct. 25, 2016, available at https://developer.amazon.com/blogs/appstore/post/Tx3N3VXX052B1 SI/introducing-the-amazon-dashbutton-and-dash-replenishment-service.

* cited by examiner

SELECTION AND DISPLAY OF CUSTOM USER INTERFACE CONTROLS

BACKGROUND

Generally described, operators of computing services may provide user interfaces ("UIs") that enable users to browse and select the items made available through the service. A graphical user interface may provide hierarchical menus, search fields, and other controls to facilitate access, and may provide user-specific controls such as listings of recent orders or selectable item recommendations.

Users of computing services may thus perform various actions relating to the services by invoking various controls of the provided user interfaces. However, the functionality of the provided user interfaces may be limited by the service's inability to anticipate the user's actions, and these limitations of the user interfaces may reduce utilization of the computing services.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
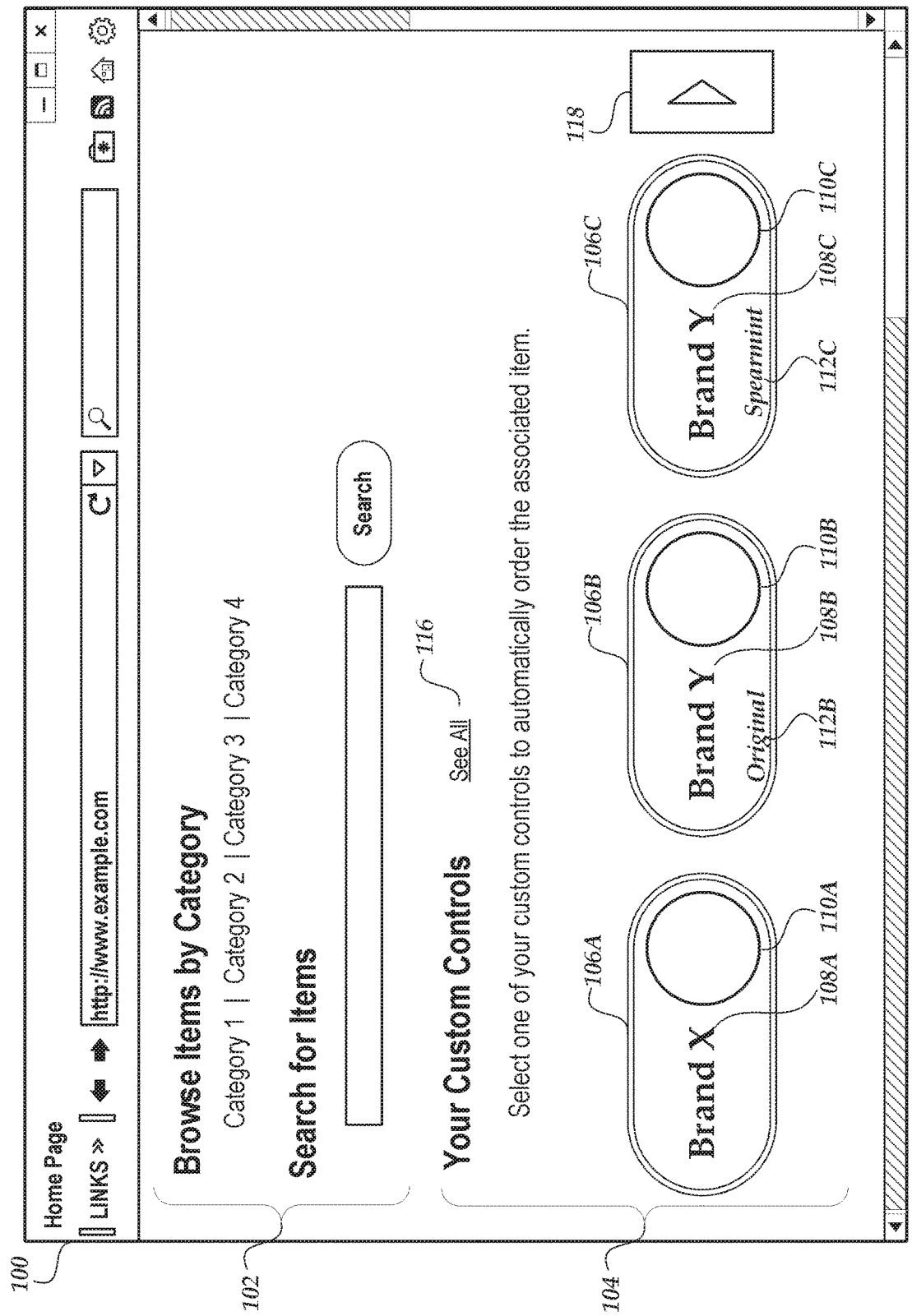
FIG. 1A is an illustrative user interface that depicts presentation of user-specific graphical user interface controls by a networked computing service.

Generally described, aspects of the present disclosure relate to user interfaces. More specifically, aspects of the present disclosure are directed to systems, methods, and computer-readable media related to displaying customized and user-specific graphical user interface controls according to a likelihood of their utilization by a given user. Illustratively, an operator of computing services may enable the generation of customized, user-specific graphical user interface controls. These custom controls may be generated, for example, by a process that detects recurring actions, such as a recurring purchase of a consumable product or service, or other actions that are frequently accessed and invoked via the user interface. In some embodiments, the computing service may present the user with an option to generate a custom user interface control to automate a recurring activity with respect to the given user, or to automate an activity that is likely to recur based on analyses of actions of the user and/or actions of other users of the service.

The computing service may present custom user interface controls as part of a more general user interface that enables access to a wider range of items or services. For example, the computing service may present a user interface with controls that enable a user to search for items available through the networked computing service, review a list of common items, navigate a hierarchy of items, and so forth. These controls may allow the user to perform a recurring activity, such as an item acquisition, but may require that the user repeatedly perform multiple interactions with the general user interface controls in order to complete the activity. Additionally, the user may repeat some activities on a regular but infrequent basis (once a year, as-needed, etc.), such that the interactions required to repeat the activity do not become familiar to the user. For example, in a traditional electronic catalog environment, if a given user orders a specific item on an infrequent basis, the user will typically navigate through multiple interfaces or pages (such as an initial search page to locate a listing for the item, or a page listing a number of past orders by the user to locate an order that includes the item) in order to eventually reach a page that includes a selectable option to place a new order for the item, at which point the user would typically provide additional order details.

The computing service described herein may present user interface controls that are customized for the activities of a particular user. These custom user interface controls may be presented in addition to the general user interface controls. For example, the computing service may generate a user interface based on a template that specifies a number of custom user interface controls to display. However, a particular custom user interface control may not always be relevant to the user at a given time. For example, selection of a particular custom user interface control may cause performance of an action that the user typically performs once a year (such as purchasing an item associated with a particular holiday). This custom user interface control may be relevant to the user at the time of year when the user typically performs the action, but not at other times. As a further example, a custom user interface control that displays the status of an action currently in progress (e.g., shipping an order) may be highly relevant for a short period of time, and display of such a control during the appropriate time period may prevent duplicate orders.

Accordingly, the computing service may determine the relevancy of various custom user interface controls, and may select a subset of controls for display in various user interfaces based on their relevancy at a given time. The relevancy of a custom user interface control may be determined, for example, in terms of a likelihood that the control will be selected or used in the current session, a likelihood that the control will display relevant information, a likelihood that a frequently performed action is due or overdue to be performed, and so forth.

The computing service may further determine and/or display categories of custom user interface controls, and may determine the relevance of controls based on their categories. For example, a user may request display of items in a particular category. The computing service may therefore identify and display custom user interface controls associated with that category or similar categories. The computing service may further determine the relevancy of custom user interface controls within a category, and display them accordingly.

By displaying relevant custom user interface controls, the computing service may create a customized user experience that cannot be duplicated in the pre-Internet world. For example, the computing service may create the digital equivalent of a grocery store in which one of the aisles is specific to the individual shopper and their predicted grocery list, with the content of the aisle changing each time the shopper returns to the grocery store.

The foregoing aspects and many of the attendant advantages will become more readily appreciated as the same become better understood by reference to the following descriptions of illustrative embodiments, when taken in conjunction with the accompanying drawings depicting the illustrative embodiments.

FIG. 1A depicts an illustrative user interface 100 that implements aspects of the present disclosure. Although depicted as a web-based interface for purposes of illustration, the user interface 100 is not limited to a particular mode of presentation, and aspects of the present disclosure include presentation in other formats, as discussed below. In the illustrated embodiment, the user interface 100 includes standard user interface controls 102, which may include category menus, search fields, or other user interface controls that enable the user to access content.

The user interface 100 further includes a custom control display region 104, which displays a number of custom user interface controls 106A-C. In some embodiments, each custom user interface control 106A-C includes an information panel 108A-C, which may display information such as a brand name, logo, or other information that identifies the action to be performed when the custom user interface control 106A-C is selected. In further embodiments, the information panel 108A-C may itself be selected and may display further information regarding the item and/or the action associated with the control 106A-C. In various embodiments, the particular custom user interface controls 106A-C may be selected for display according to a likelihood of usage for each control, which may be determined as described below.

The custom user interface controls 106A-C may each further include a corresponding button 110A-C, which, when selected, performs an action associated with the control 106A-C. For example, the control 106A may be associated with the action of placing an order for a "Brand X" item, and a user selecting the button 110A (such as by selecting the button using a cursor or by touching a touchscreen) may result in the order being placed. While reference is made herein to the controls each including a button, it will be appreciated that, in other embodiments, an entire control (such as control 106A) may be selectable to perform the action associated with the control, without any button or sub-portion of the displayed control being present or separately selectable. Furthermore, the portion of a displayed control that is selectable in order to perform the associated action may have a variety of appearances, some of which may not resemble a button or be considered a button.

In certain embodiments, some custom user interface controls 106B-C may include an item description 112B-C, which may describe a particular item when two or more controls 106B-C display common information on their respective information panels 108B-C. For example, custom user interface controls 106B and 106C may each be associated with a respective action involving a "Brand Y" item, but the specific item may differ between the two controls 106B and 106C. The item descriptions 112B and 112C may thus enable the user to distinguish between the two controls 106B and 106C, and to select the control associated with the desired action (such as ordering an "Original" flavor of a certain Brand Y item or ordering a "Spearmint" flavor of either the same or different Brand Y item).

Figure 1B:
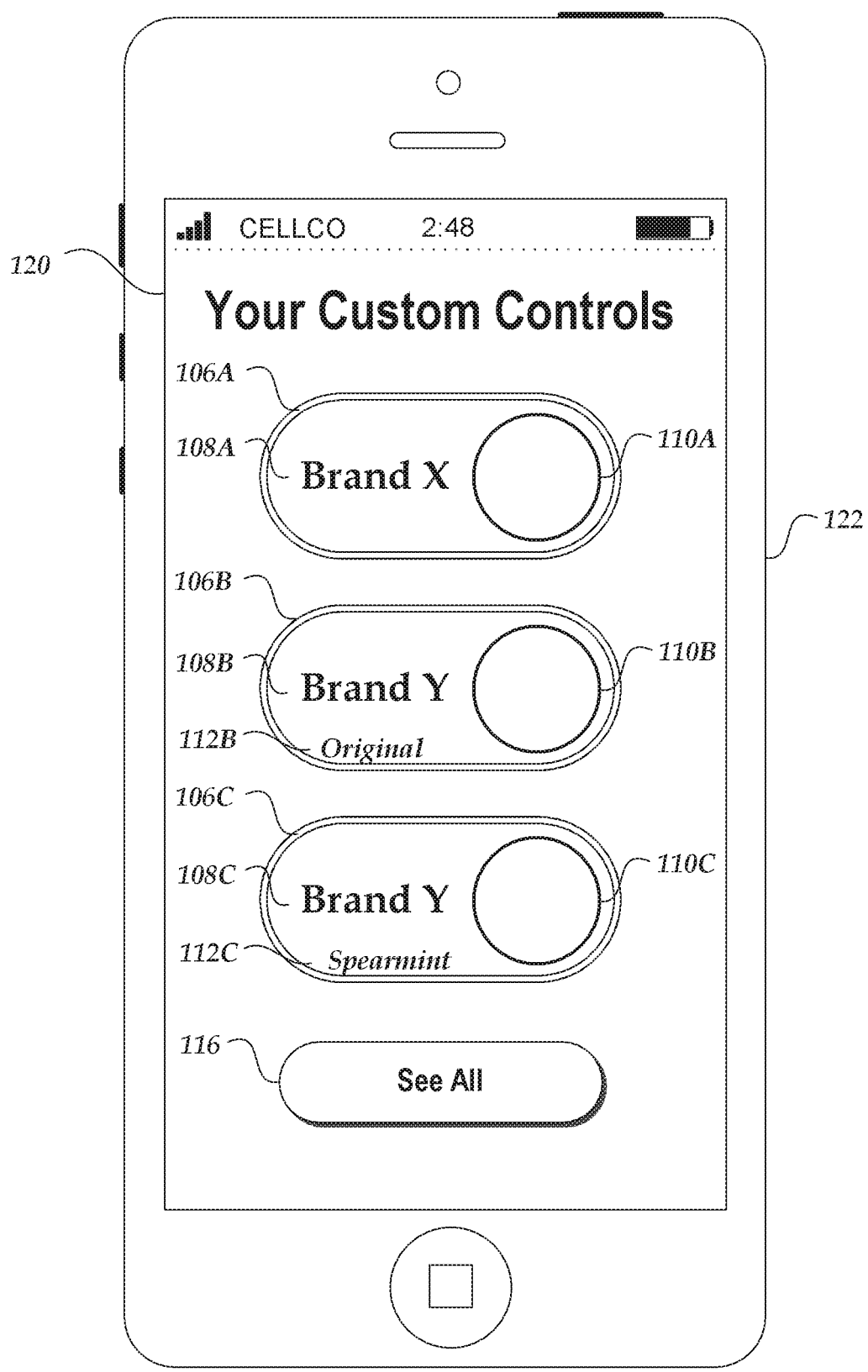
FIG. 1B is an illustrative user interface that depicts an alternative presentation of user-specific graphical user interface controls by a networked computing service.
Figure 1C:
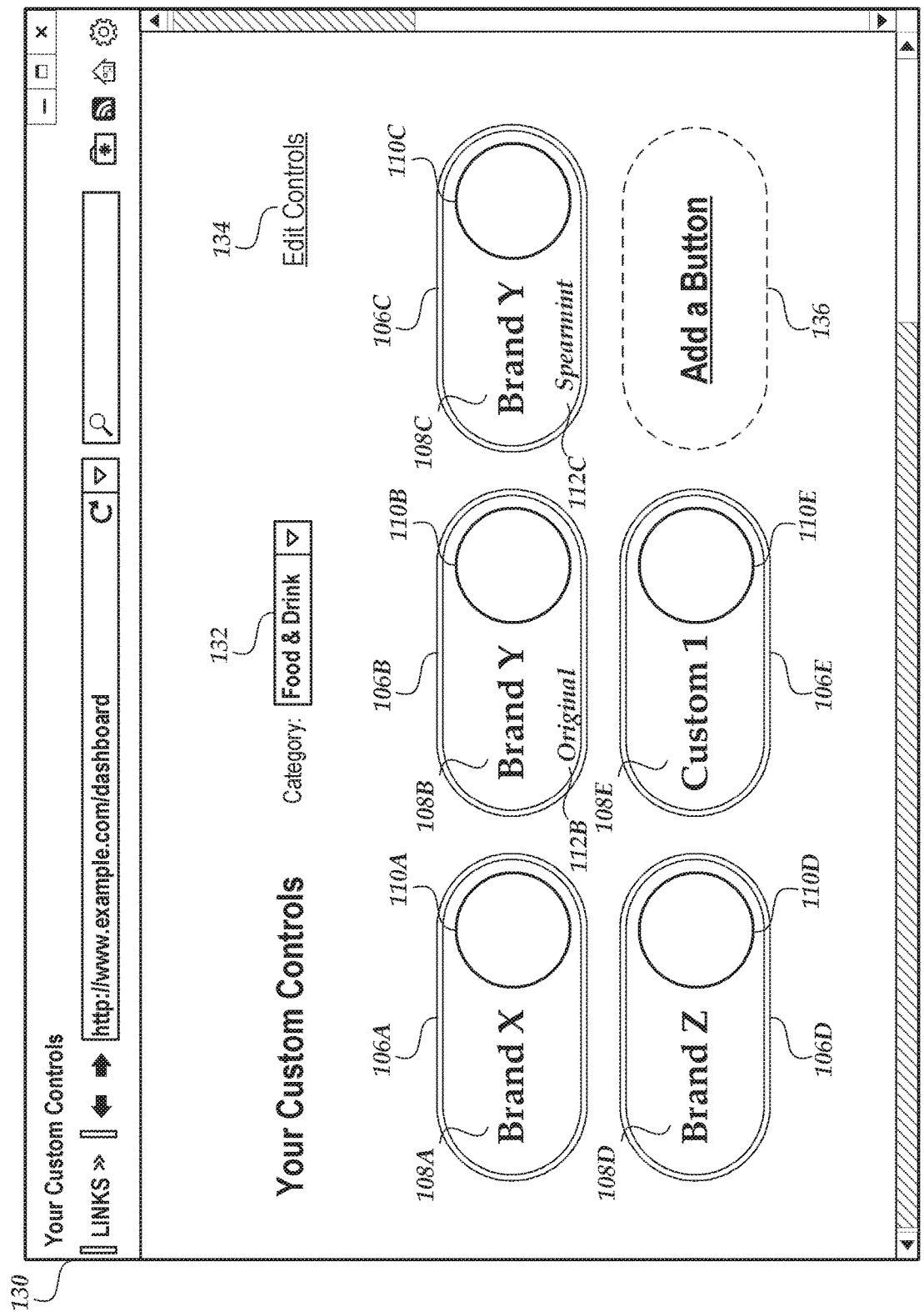
FIG. 1C is an illustrative user interface for selecting and managing user-specific graphical user interface controls.

The user interface 100 may further include a selectable option 116 that may be selected by the user in order to view a second user interface, such as the user interface 130 depicted in FIG. 1C, that enables viewing additional custom user interface controls. The user interface 100 may also include a selectable option such as a scroll arrow 118, which may facilitate viewing of additional custom user interface controls.

FIG. 1B depicts an additional illustrative user interface 120 that may be generated in association with aspects of the present disclosure. The user interface 120 is displayed on a mobile computing device 122, which provides a touch-based interface to the custom user interface controls 106A-C, their respective information panels 108A-C, buttons 110A-C, and item descriptions 112B-C, and the selectable option 116, all of which are as described with reference to FIG. 1A above.

Illustratively, in some embodiments, the custom user interface controls 106A-C are presented consistently across a number of computing devices and interfaces. For example, the custom user interface controls 106A-C may be presented on an embedded computing device built into an appliance (e.g., a refrigerator or microwave), or on a dedicated computing device that is designed and configured to display custom user interface controls (e.g., a dedicated touchscreen for use in a supply closet or warehouse). In other embodiments, the networked computing service may select a subset or category of custom user interface controls 106A-C to display in a particular user interface. For example, a particular computing device may be associated with a kitchen or a pantry, and the networked computing service may select custom user interface controls that are specific to that category or environment. As a further example, the networked computing service may select custom user interface controls whose actions are related to a particular activity (e.g., working, gardening, attending school, etc.). In some embodiments, a particular embedded device or other computing device may specify a category or a device type when requesting custom user interface controls for display on the device. For example, a device may send a request that identifies itself as a refrigerator, or that specifies a "Food and Drink" category.

FIG. 1C depicts an illustrative user interface 130 that enables a user to view the user's entire collection of custom user interface controls 106A-E, to filter the controls by category, and to edit the controls or create additional controls. In addition to the custom user interface controls 106A-C, their respective information panels 108A-C, buttons 110A-C, and item descriptions 112B-C, all of which are as described with reference to FIG. 1A above, the user interface 130 includes custom user interface controls 106D-E, which contain information panels 108D-E and buttons 110D-E. Information panel 108E displays user-generated custom information (which may be text and/or graphical data previously set by the user when configuring the specific custom user interface control 106E), rather than information automatically generated by a computing system based on the action associated with the control 106E. Illustratively, control 106E may be associated with an action or set of actions that involve multiple brands, no particular brand, or the user may have customized the information panel 108E to minimize confusion with other custom user interface controls 106A-D.

The user interface 130 further includes a category selector 132, which enables the user to filter the user's custom UI controls 106A-E by category. Illustratively, UI control categories may include categories of products, services, or other items associated with the controls 106A-E, categories of actions associated with the controls 106A-E (e.g., "add to cart" actions, "place order" actions, "change scheduled delivery date" actions, and so forth), categories of user activities (working, learning, gardening, etc.), and so on. The user interface 130 further includes a selectable option 134 that enables the user to request a user interface for editing custom UI controls, such as the example user interface 140 depicted in FIG. 1D. Still further, the user interface 130 includes an add button 136, which enables the generation of additional custom user interface controls.

In some embodiments, the user interface 130 enables assignment of custom UI controls to preexisting or user-defined categories. For example, the user may create a "Master Bathroom" category, and may assign custom UI controls to the category. In further embodiments, the user interface 130 may enable associations between user-defined categories and particular devices, between user-defined categories and predefined categories, and so forth. For example, the user may define a category and associate it with a particular device, such as the mobile computing device 122 of FIG. 1B or an embedded or dedicated computing device as described above. As a further example, the user may define a "My Garden" category and associate it with a predefined "Home and Garden" category. Still further, the user may create a custom UI control that is not associated with a category, and may then assign it to a new or existing category.

Figure 1D:
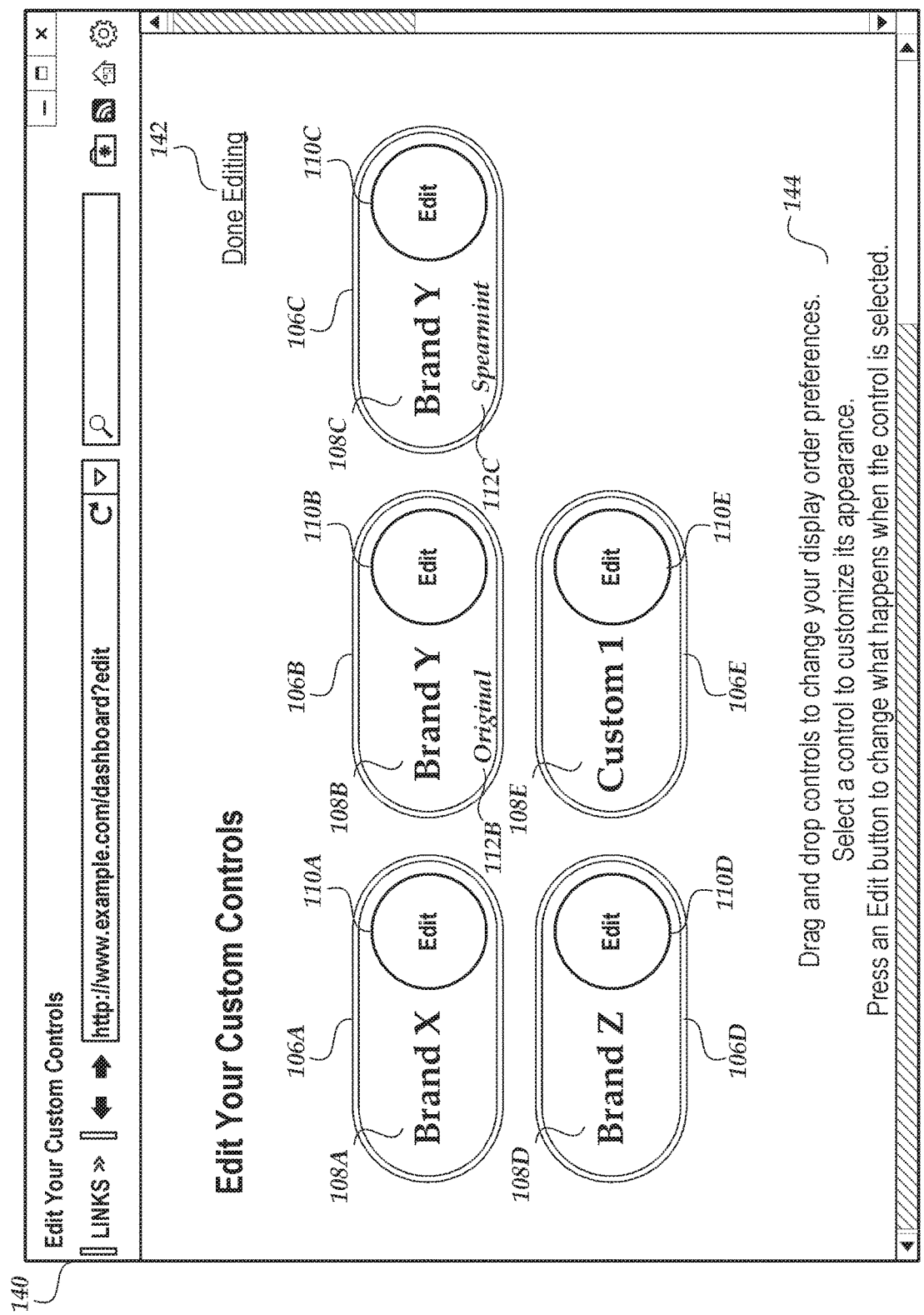
FIG. 1D is an illustrative user interface for sorting and editing user-specific graphical user interface controls.

FIG. 1D depicts an illustrative user interface 140 that enables editing of the user's custom user interface controls 106A-E. The custom user interface controls 106A-E, their respective information panels 108A-E, buttons 110A-E, and item descriptions 112B-C, are as described with reference to FIG. 1C above, except that in some embodiments buttons 110A-E display a message to indicate that the user selecting the button will cause display of an editing user interface (such as the example user interface 160 depicted in FIG. 1E) rather than causing the action associated with the control to be performed. The user interface 140 further includes a done editing option 142, which may illustratively return the user to a previously displayed user interface (e.g., user interface 130) when selected by the user, and an informational message 144, which provides instructions for editing the controls 106A-E.

Illustratively, selecting a control 106A-E, information panel 108A-E, or item description 112B-C in the user interface 140 allows the user to modify the appearance of the selected entity. For example, selecting information panel 108B may allow the user to choose an alternate brand, logo, or other information for display in the panel 108B. As a further example, selecting item description 112B (or the corresponding empty space on control 106A, 106D, or 106E) may allow the user to enter alternative text for display. Other aspects of the appearance of controls 106A-E and their respective elements, such as colors or shading, may additionally be customizable or editable through the user interface 140. In some embodiments, selecting and dragging a control 106A-E may allow the user to specify a preferred order for display of the custom controls, which may be combined with or used in place of a determined display order. For example, the user interfaces 100 and 120 may provide options for selecting a display order, and the display order options may include ordering according to relevance, user preferences, or other criteria. Further, the options may include combinations such as displaying categories in a particular order and then displaying the controls within each category according to their relevance.

Figure 1E:
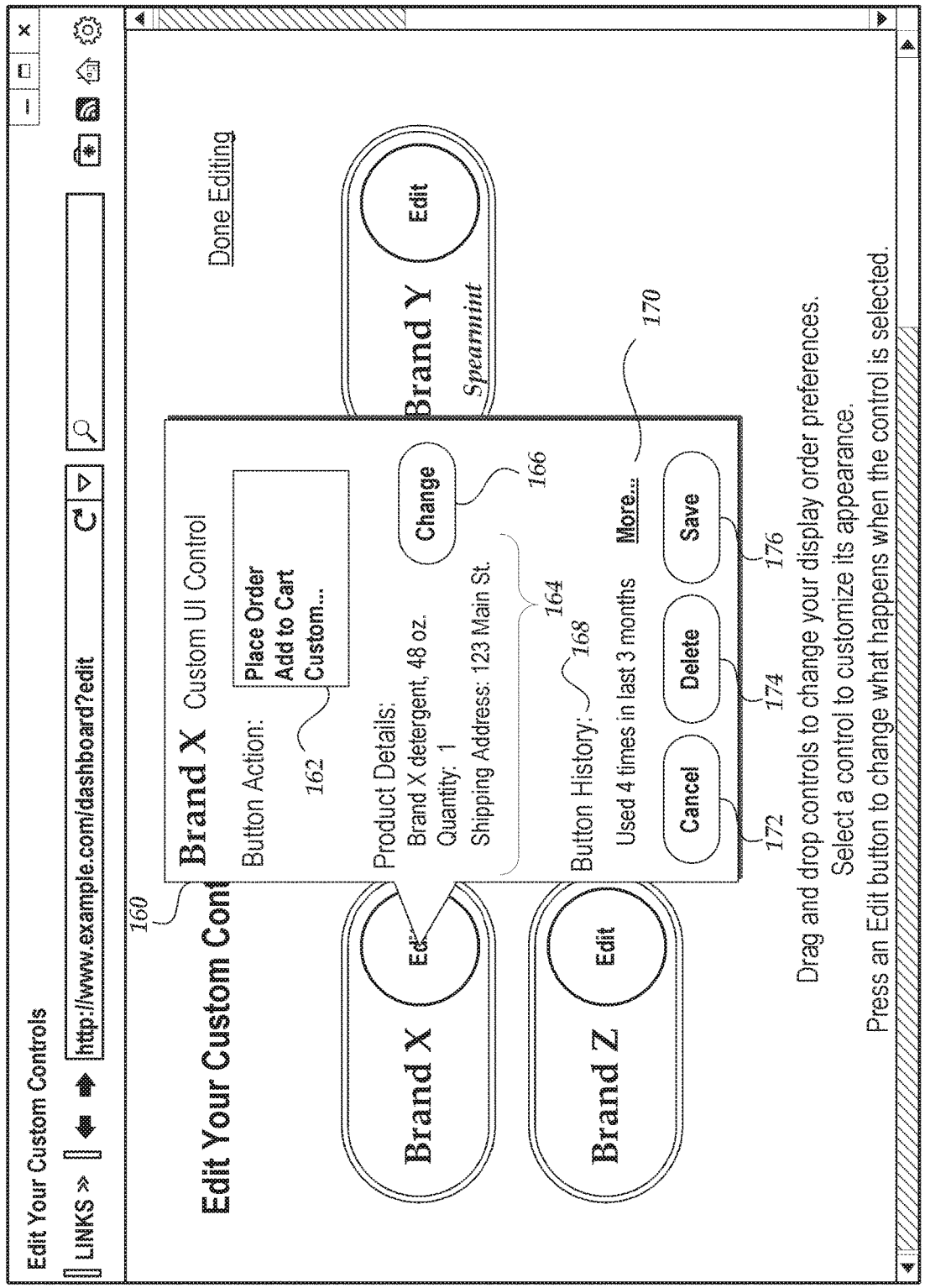
FIG. 1E is an illustrative user interface for editing the action that is performed when a user-specific graphical user interface control is selected.

Selecting one of the buttons 110A-E (for example, button 110A) may cause an additional user interface, such as the example user interface 160 depicted in FIG. 1E, to be overlaid atop the user interface 140. As shown in FIG. 1E, the overlay 160 includes a button action selector 162, an item detail summary 164, a change item detail control 166, an activity history summary 168, an activity history detail link 170, a cancel button 172, a delete button 174, and a save button 176. For clarity of illustration, reference numbers of elements of the overlaid user interface 140, as previously described in FIG. 1D, are not repeated in FIG. 1E.

Illustratively, with further reference to FIG. 1E, the button action selector 162 may be used to modify the action associated with the custom user interface control 106A, by selecting from the list of available actions. For example, the action associated with control 106A may be modified from placing an order for a particular item to placing the item in the user's electronic shopping cart. In various embodiments, actions available for selection may include placing an order, placing an item in a shopping cart, changing a scheduled delivery date (e.g., to accelerate delivery), allocating or deallocating a networked computing resource, creating or deleting a virtual machine instance, scheduling an appointment, sending a message, or other activities.

The item detail summary 164 may display information regarding an item that will be ordered, placed in an electronic shopping cart, or will otherwise be the subject of an action that is performed when the user selects the control 106A. In the illustrated embodiment, the item detail summary 164 indicates that, when control 106A is selected, an order may be placed for one 48 oz. box of "Brand X" detergent to be delivered to the specified shipping address. The user may select the item detail change control 166 to modify these parameters. For example, selecting the item detail change control 166 may display an interface that enables selecting a different item from a list of available "Brand X" items, changing the quantity of items in the order, changing the shipping address, and so forth. It will be appreciated that these configurable settings or parameters, once configured, may remain associated with the given control, such that the user need not provide the parameter information or even review the parameter information when selecting to perform the control's action in the future.

In some embodiments, the overlay 160 includes an activity history summary 168, which may display a summary of recent usage of the control 106A. The summary of recent usage may indicate how often the control 106A was used, or in some embodiments may indicate how often the action associated with the control 106A was performed, either by utilizing the control 106A or by using other controls of the user interface 100. For example, the activity history summary 168 may include information from a purchase history that predates the creation of the particular custom user interface control 106A. In other embodiments, the activity history summary 168 may be presented as a table, list, chart, calendar, or in other formats. The activity history detail option 170, when selected, may enable viewing of more detailed information regarding the activity history associated with the control 106A.

The cancel option 172, delete option 174, and save option 176 enable canceling changes made to the control 106A via the overlay 160, deleting the control 106A, and saving changes made to the control 106A, respectively. In various embodiments, selection of any of these options may display confirmation messages and/or cause the overlay 160 to be dismissed in addition to their primary functions.

It will be understood that the user interfaces in FIGS. 1A-E are described for purposes of example, and that other user interfaces that provide custom user interface controls and display them according to a likelihood of usage are within the scope of the present disclosure. For example, an embedded computing device may display a user interface that implements more or fewer components than those described in FIGS. 1A-E. The disclosed user interfaces are thus understood to be illustrative and not limiting.

Figure 2:
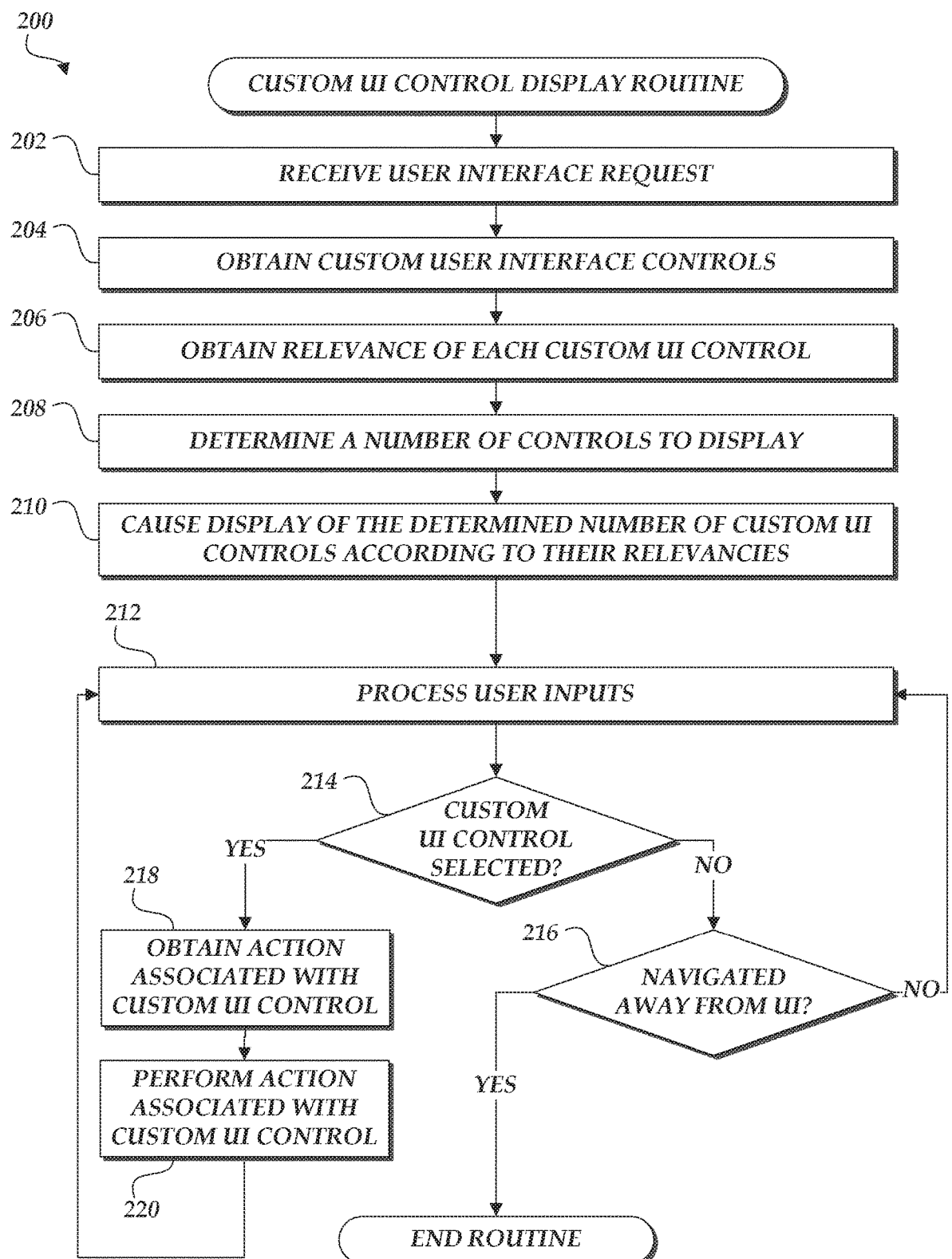
FIG. 2 is a flow diagram depicting an illustrative user-specific graphical user interface control display routine in accordance with aspects of the present disclosure.

With reference now to FIG. 2, an example custom UI display routine 200 will be described. The example routine 200 may be carried out, for example, by the custom user interface server 400 of FIG. 4, which will be described below. At block 202, a request may be received to display a user interface that includes custom UI controls. The request may be, for example, a request to display a web page, launch an application on a mobile or touchscreen computing device, activate the display of an embedded computing device, or other such requests. In some embodiments, the request may be associated with a particular user of computing services. The user may be identified within the request or may be determined from data in the request, such as by the user's device being logged into a specific user account when the request is generated.

At block 204, a set of custom user interface controls may be obtained. Illustratively, the custom user interface controls may be obtained from a data store, may be specific to the particular user, and may include controls that the user previously created and/or that were created on behalf of the user. For example, a set of controls A, B, and C may be obtained. Each of the controls A, B, and C may be associated with the user who generated the request at block 202, and each individual control may be associated with a different action. For example, selection of control A may result in placing an order for a specific item to be delivered to a specific address, selection of control B may result in canceling a scheduled delivery of an item and instead placing an order for expedited delivery of the item, and selection of control C may cause an item to be put into an electronic shopping cart.

At block 206, a relevancy of each of the obtained custom UI controls may be obtained. Illustratively, the relevancy of a custom UI control may be obtained by executing a routine, such as the example routine 300 described in more detail below with reference to FIG. 3. In various embodiments, the relevancies of custom UI controls may be obtained as probabilities, weighting factors, an ordered list of the custom UI controls, or in other formats. For example, probabilities of 0.3, 0.4, and 0.1 may be obtained for controls A, B, and C, respectively. The probability for a given control may represent, in one embodiment, an estimate of the relative probability that the user will select to perform the action associated with the given control at the given time (e.g., in the browsing session in which the user interface will be displayed, or within a certain time period following receipt of the user interface request at block 202). In other embodiments, the relevance of a custom UI control may be determined based on, for example, an order status message that is displayed by the custom UI control, a frequency of use of the custom UI control, or other factors.

At block 208, how many controls to display may be determined. In some embodiments, the request received at block 202 may specify a number of controls to display, in which case block 208 may be omitted. In other embodiments, the number of controls to display may be determined based on, for example, a screen size or other characteristics of a computing device that will display the controls. In some embodiments, a template may be retrieved and the number of controls may be determined from the number of positions within the template that can accommodate a control having the particular dimensions of the controls obtained at block 204.

At block 210, the determined number of custom UI controls may be displayed according to their relevance. Continuing the example above, the routine 200 may determine that two controls will be displayed. The routine 200 may thus display control B, which had the highest probability of usage (0.4), and control A, which had the second-highest probability of usage (0.3). In other embodiments, a subset of the controls to display may be selected based on factors other than relevance. For example, user preferences may indicate that a certain favorite control of the user be presented regardless of the estimated likelihood that the user will select the given control in a specific session. In other embodiments, a predetermined order may be assigned to the obtained user interface controls, which may be used as a default display order unless another control is determined to have a very high relevance in the given instance (e.g., above a certain likelihood threshold), in which case the given control may be selected for display in a position that is higher or more prominent than its position in the default order.

At block 212, inputs to the user interface may be processed. Illustratively, inputs that select or otherwise interact with generic, non-custom user interface controls may be processed according to the standard behaviors of these controls. At decision block 214, a determination may be made as to whether a custom UI control has been selected. If not, then at decision block 216 a determination may be made as to whether an input has been received that navigates away from the currently displayed user interface. For example, an input may be received that represents closing a window associated with the user interface. If the determination at decision block 216 is that such an input has been received, then the routine 200 ends; if not, the routine 200 branches to block 212 and continues processing inputs.

If the determination at block 214 is that a custom UI control has been selected, then at block 218 the action associated with the custom UI control may be obtained. Obtaining the action information may include, for example, retrieving a set of data previously associated with the control and stored in association with a unique identifier that identifies the particular control. The retrieved data may include an action indicator (such as "purchase", "add to cart", or "cancel order") and a number of preset parameters associated with the combination of the control and the action (such as an item identifier, an item quantity, item attributes, a delivery address, shipping options, billing information, a payment method indicator, an existing order number, and/or other information depending on the action and embodiment). For example, the input may indicate selection of control B, and the routine 200 may thus obtain the action of canceling a scheduled delivery of an item and instead placing an order for expedited delivery of the item. At block 220 the action associated with the selected custom UI control may be performed, and the routine 200 may then return to block 212 and continue processing of inputs to the user interface.

It will be understood that the blocks of the routine 200 may be combined, divided, or varied within the scope of the present disclosure. For example, block 208 may be carried out prior to blocks 202 and/or 204. As further examples, block 218 may be carried out at any time after block 204, or may be combined with block 204, and blocks 214 and 216 may be carried out in either order.

Figure 3:
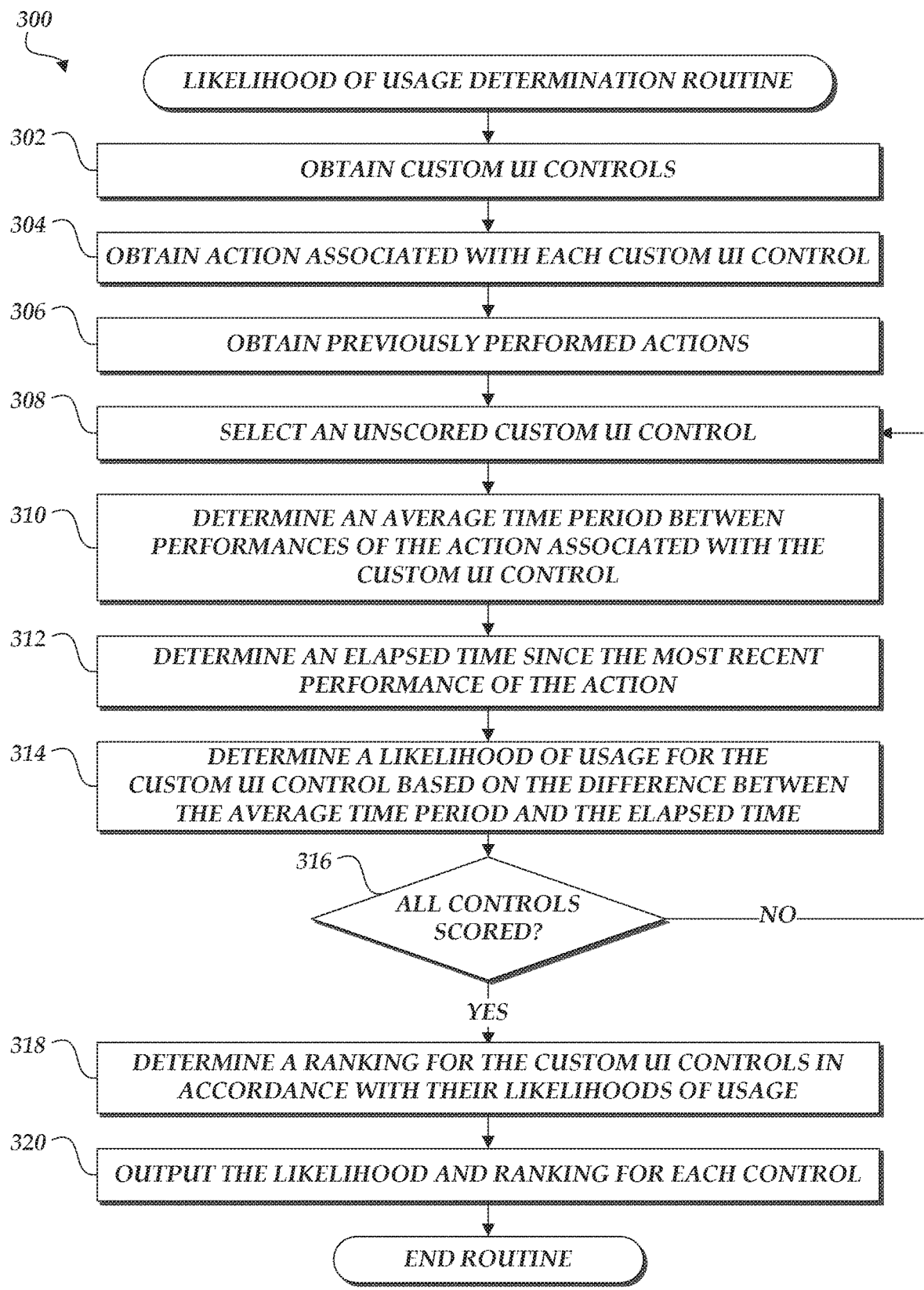
FIG. 3 is a flow diagram depicting an illustrative display order determination routine in accordance with aspects of the present disclosure.

Turning now to FIG. 3, an example routine 300 for determining likelihoods of usage for custom UI controls will be described. The example routine 300 may be carried out, for example, by the custom user interface server 400 of FIG. 4. At block 302, custom UI controls may be obtained. As described above, the custom UI controls may be obtained from a data store, or may be passed to the routine 300 by another routine (such as the routine 200 depicted in FIG. 2). At block 304, the action associated with each custom UI control may be obtained. For example, as described above, the action associated with a custom UI control may be to place an order for a particular item.

At block 306, a set of previously performed actions may be obtained. For example, the custom UI controls may be associated with a particular user, and an order history of the particular user may be obtained. As a further example, each custom UI control may be associated with placing an order for a particular item (that is, control A may be associated with placing an order for item A, control B associated with ordering item B, and so forth), and an order history containing orders of these items may be obtained. In some embodiments, the order history or histories may include orders that were placed using generic user interface controls, custom UI controls, or a combination of both, and may further include orders that were placed but later canceled or returned.

At block 308, an unscored custom UI control (e.g., a control for which a likelihood of usage has not yet been determined by this execution of the routine 300) may be selected. Next, at block 310, an average time period between performances of the action associated with the custom UI control may be determined. For example, an order history of the user may be analyzed to determine that the user places an order for item A an average of once a month. At block 312, an elapsed time may be determined since the most recent performance of the action. Continuing the example above, the determination may be that the user most recently placed an order for item A five days ago.

At block 314, a likelihood of usage may be determined for the custom UI control based on the difference between the average time period and the elapsed time. For example, the determination may be that control A has a relatively low likelihood of usage, given that the user typically orders item A once a month and last placed an order for it five days ago. In some embodiments, a standard deviation of item A orders may be determined in order to estimate the present likelihood of an item A order (and therefore the likelihood of usage for a custom UI control that, when selected, places an order for item A).

It will be understood that the interactions described at blocks 310-314 of routine 300 are an example embodiment of determining a likelihood of usage for a custom UI control, and that other embodiments are within the scope of the present disclosure. For example, the routine 300 may instead determine a likelihood of usage based on other uses of similar controls, seasonal variations or other patterns in placed orders (e.g., an increased probability that cold-weather items will be ordered in cold weather, or that an item undergoing a surge in popularity will be ordered), orders of related items (e.g., that a user recently purchased an item with which a control's item is frequently used), or other data. As another example, controls that were more recently added to the user's collection of custom controls or that were more recently edited by the user may be assigned a relatively higher likelihood of usage than if the same control has been unedited and unused for a longer time period.

At decision block 316, a determination may be made as to whether a likelihood of usage has been determined for all of the custom UI controls obtained at block 304. If not, the routine 300 branches to block 308, and iterates through all of the custom UI controls. For example, the routine 300 may iterate through blocks 308-314 and determine that the user places an order for item B about once every two months on average, that the most recent order of item B was placed three months ago, and accordingly that control B has a relatively high likelihood of usage. Similarly, the routine 300 may determine that the user places an order for item C about once a year, that it has been ten months since the most recent order of item C, and that control C has a medium-high likelihood of usage. In various embodiments, likelihoods of usage may be quantified as categories (e.g., low, medium, and high), probabilities, or other values. It will be appreciated that, according to some embodiments, one or more of the user's custom controls may be associated with actions that the user has never performed, in which case a default likelihood may be assigned or a likelihood may be determined based on an analysis of the behavior of other users with respect to performing similar actions and/or selecting similar controls.

If the determination at decision block 316 is that a likelihood of usage has been determined for all custom UI controls, then the routine 300 branches to block 318. In some embodiments, at block 318 a ranking of the custom UI controls may optionally be determined. For example, a control having the highest likelihood of usage may be ranked first, a control with the next-highest likelihood of usage ranked second, and so forth. In other embodiments, block 318 may be omitted. At block 320, the likelihood of probability for each UI control (and, in some embodiments, the ranking of the controls) may be output.

It will be understood that the blocks of the routine 300 may be combined, divided, or varied within the scope of the present disclosure. For example, block 306 may be carried out prior to blocks 302 and/or 304. As a further example, blocks 310 and 312 may be carried out in either order. Still further, in some embodiments, block 302 may be omitted, and a likelihood may be determined with regard to performance of a particular action (e.g., that an order for a particular item will be placed) rather than determining a likelihood of usage for the custom UI control associated with that action.

In various embodiments, the determination of a likelihood of usage for each custom UI control may be combined with other determinations or factors to determine a relevance of each custom UI control. For example, a user preference may indicate that a particular custom UI control should always be displayed, and the relevance of that control may be determined accordingly. As a further example, a custom UI control that contains or is overlaid by an order status message (e.g., "your order will arrive on Friday") may be determined to have a high relevance despite a relatively low likelihood of usage.

Figure 4:
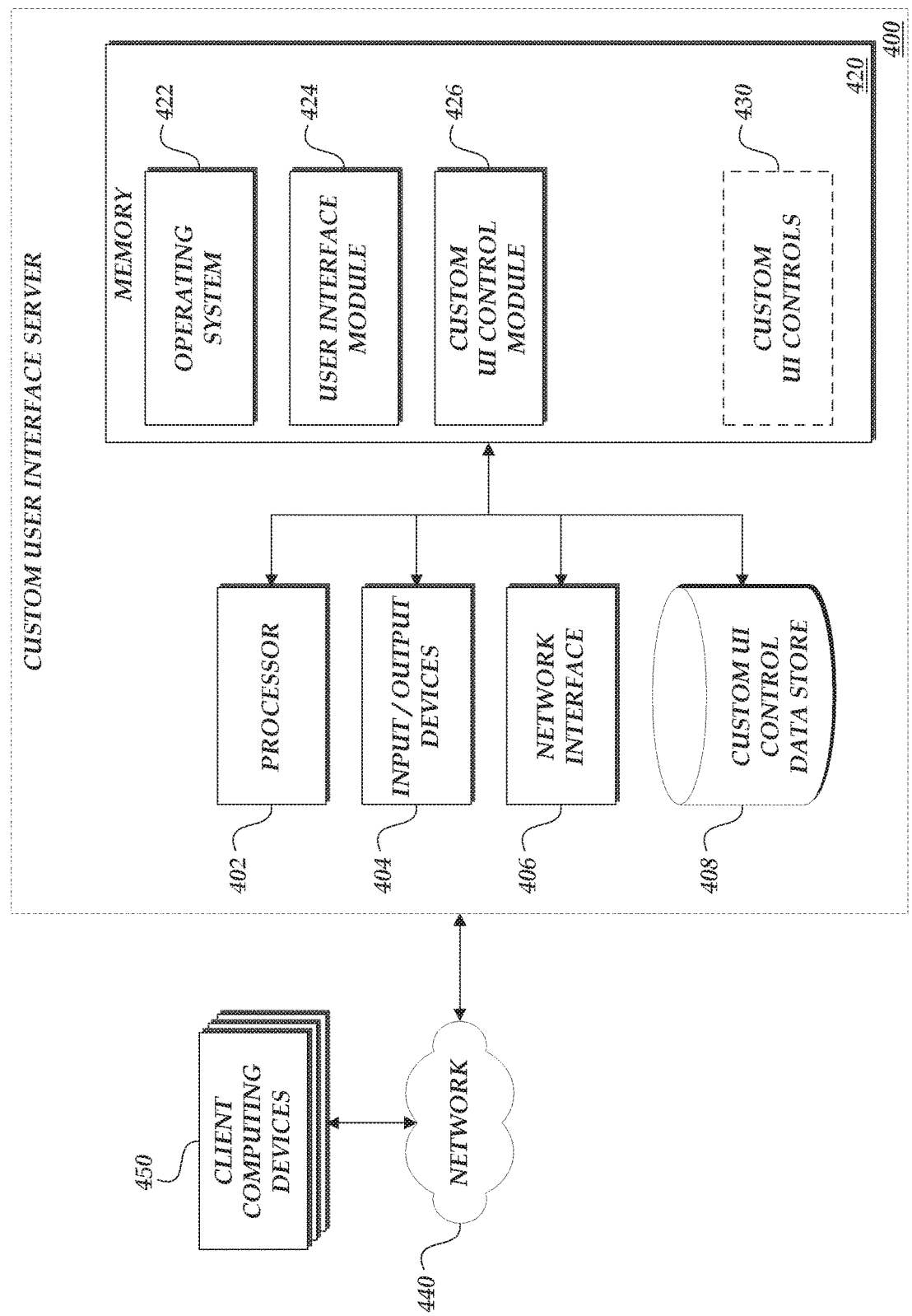
FIG. 4 is an illustrative network topology depicting a general architecture of an example computing device configured to implement aspects of the present disclosure.

FIG. 4 further depicts a network topology including client computing devices 450, a network 440, and a general architecture of a custom user interface server 400, which includes an arrangement of computer hardware and software components that may be used to implement aspects of the present disclosure. The network topology and the custom user interface server 400 may include many more (or fewer) elements than those shown in FIG. 4. It is not necessary, however, that all of these elements be shown in order to provide an enabling disclosure.

As illustrated, the custom user interface server 400 includes a processor 402, input/output devices 404, a network interface 406, and a data store 408, all of which may communicate with one another by way of a communication bus. The network interface 406 may provide connectivity to one or more networks (such as network 440) or computing systems and, as a result, may enable the custom user interface server 400 to receive and send information and instructions from and to other computing systems or services.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the custom user interface server 400. The memory 420 may further store computer specific computer-executable instructions and other information (which may be referred to herein as "modules") for implementing aspects of the present disclosure. For example, the memory 420 may include a user interface module 424, which may perform various operations with regard to displaying the user interfaces described herein. For example, the user interface module 424 may store and retrieve templates for user interfaces that specify a number and placement of custom UI controls.

In some embodiments, the memory 420 may include a custom UI control module 426, which may be executed by the processor 402 to perform various operations, such as those operations described with reference to FIGS. 2 and 3. The memory 420 may further include custom UI controls 430 that are loaded into the memory 420 as various operations are performed.

While the operating system 422, the user interface module 424, and the custom UI control module 426 are illustrated as distinct modules in the memory 420, in some embodiments, the user interface module 424, and the custom UI control module 426 may be incorporated as modules in the operating system 422 or another application or module, and as such, separate modules may not be required to implement some embodiments. In some embodiments, the user interface module 424 and the custom UI control module 426 may be implemented as parts of a single application.

It will be recognized that many of the devices described above are optional and that embodiments of the custom user interface server 400 may or may not combine devices. Furthermore, devices need not be distinct or discrete. Devices may also be reorganized. For example, the custom user interface server 400 may be represented in a single physical device or, alternatively, may be split into multiple physical devices. In some embodiments, components illustrated as part of the custom user interface server 400 (such as custom UI control module 426) may additionally or alternatively be included in the client computing devices 450, such that some aspects of the present disclosure may be performed by the custom user interface server 400 while other aspects are performed by a client computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
   a memory;
   a processor in communication with the memory; and
   specific computer-executable instructions stored in the memory that, when executed by the processor, configure the processor to:
   obtain a plurality of custom user interface controls associated with a user from a data store, wherein each of the plurality of custom user interface controls is associated with a respective at least one action;
   for each control of the plurality of custom user interface controls:
   determine, based at least in part on a plurality of previously performed actions, an average time between performances of the at least one action associated with the control;
   determine, based at least in part on the plurality of previously performed actions, an elapsed time since the at least one action was last performed; and
   determine, based at least in part on the average time and the elapsed time, a relevance of the control;
   determine a number of custom user interface controls to display;
   select, based at least in part on the relevance of each of the plurality of custom user interface controls, a subset of the plurality of custom user interface controls, wherein a number of controls in the subset corresponds to the number of custom user interface controls to display; and
   cause display of a user interface including at least the subset of the plurality of custom user interface controls.

2. The system of claim 1, wherein the relevance is determined further based at least in part on a user preference.

3. The system of claim 2, wherein each of the plurality of custom user interface controls is associated with a respective category, and wherein the user preference specifies a category.

4. The system of claim 1, wherein the number of custom user interface controls to display is determined based at least in part on a size of a screen used to display the user interface.

5. The system of claim 1, wherein the at least one action associated with each of the plurality of custom user interface controls comprises a purchase of a respective item.

6. The system of claim 5, wherein the relevance of each control of the plurality of custom user interface controls is determined based at least in part on a category of the respective item associated with the control.

7. The system of claim 5, wherein the processor is further configured to obtain a purchase history of the user, wherein the relevance of each control of the plurality of custom user interface controls is determined based at least in part on the purchase history of the user.

8. The system of claim 7, wherein the relevance of each control is determined further based at least in part on a frequency of purchase of the respective item.

9. The system of claim 7, wherein the relevance of each control is determined further based at least in part on an elapsed time since a purchase of the respective item.

10. The system of claim 5, wherein the processor is further configured to obtain purchase histories of a plurality of users, wherein the relevance of each control of the plurality of custom user interface controls is determined based at least in part on the purchase histories of the plurality of users.

11. The system of claim 1, wherein a relevance of a first custom user interface control is determined based at least in part on a pending completion of at least one action associated with the first custom user interface control.

12. A computer-implemented method comprising:
    obtaining, from a data store, a plurality of custom user interface controls associated with a user, wherein each of the plurality of custom user interface controls is associated with a respective at least one action;
    for each control of the plurality of custom user interface controls:
    determining, based at least in part on a plurality of previously performed actions, an average time between performances of the at least one action associated with the control;
    determining, based at least in part on the plurality of previously performed actions, an elapsed time since the at least one action was last performed; and
    determining, based at least in part on the average time and the elapsed time, a relevance of the control;
    determining a number of custom user interface controls to display;
    selecting, based at least in part on the relevance of each of the plurality of custom user interface controls, a subset of the plurality of custom user interface controls, wherein a number of controls in the subset corresponds to the number of custom user interface controls to display; and
    causing display of a user interface including at least the subset of the plurality of user interface controls.

13. The computer-implemented method of claim 12, wherein the at least one action comprises one of placing an order for a specific item previously associated with the control, adding the specific item to an electronic shopping cart, or changing a delivery schedule associated with an item order.

14. The computer-implemented method of claim 12 further comprising:
- determining a categorization of the plurality of custom user interface controls, the categorization including two or more categories, wherein the categorization associates each of the plurality of custom user interface controls with a respective category; and
- receiving a selection of a first category from the categorization,
- wherein each custom user interface control in the subset of the plurality of custom user interface controls is associated with the first category.

15. The computer-implemented method of claim 14, wherein the categorization is determined based at least in part on one or more user preferences.

16. The computer-implemented method of claim 14, wherein the categorization is determined based at least in part on the at least one action associated with each of the plurality of custom user interface controls.

17. A non-transitory computer-readable medium storing computer-executable instructions that, when executed by a processor, configure the processor to:
- obtain, from a data store, a plurality of custom user interface controls associated with a user, wherein each of the plurality of custom user interface controls is associated with a respective at least one action;
- for each control of the plurality of custom user interface controls:
  - determine based at least in part on the plurality of previously performed actions, an average time between performances of the at least one action associated with the control;
  - determine, based at least in part on the plurality of previously performed actions, an elapsed time since the at least one action was last performed; and
  - determine, based at least in part on the average time and the elapsed time, a relevance of the control;
- determine a number of custom user interface controls to display;
- select, based at least in part on the relevance of each of the plurality of custom user interface controls, a subset of the plurality of custom user interface controls, wherein a number of controls in the subset corresponds to the number of custom user interface controls to display; and
- cause display of a user interface including at least the subset of the plurality of user interface controls.

18. The non-transitory computer-readable medium of claim 17, wherein each of the plurality of custom user interface controls is associated with one or more predefined parameters.

19. The non-transitory computer-readable medium of claim 18, wherein the one or more predefined parameters associated with each custom user interface control comprise billing and shipping information.

* * * * *